(12) United States Patent
Jones

(10) Patent No.: US 7,120,190 B2
(45) Date of Patent: Oct. 10, 2006

(54) LOW POWER RC CLOCKING SYSTEM FOR WIRELESS COMMUNICATIONS

(75) Inventor: Huw Bryn Jones, Reading (GB)

(73) Assignee: VTech Communications, Ltd., Tai Po (HK)

( * ) Notice: Subject to any disclaimer, the term of this patent is extended or adjusted under 35 U.S.C. 154(b) by 794 days.

(21) Appl. No.: 10/198,888

(22) Filed: Jul. 19, 2002

(65) Prior Publication Data
US 2004/0013167 A1    Jan. 22, 2004

(51) Int. Cl.
*H04B 1/713* (2006.01)
(52) U.S. Cl. .................................. 375/137; 375/136
(58) Field of Classification Search ................ 375/132, 375/133, 134, 136, 137
See application file for complete search history.

(56) References Cited

U.S. PATENT DOCUMENTS 5,940,431 A * 8/1999 Haartsen et al. ............ 375/131
6,389,057 B1 * 5/2002 Haartsen ..................... 375/132
6,473,412 B1 * 10/2002 Haartsen ..................... 370/331

* cited by examiner

Primary Examiner—Young T. Tse
Assistant Examiner—Sam K. Ahn
(74) Attorney, Agent, or Firm—Pillsbury Winthrop Shaw Pittman LLP

(57) ABSTRACT

A low-power sleep mode of operation for a frequency hopping radio receiver is presented. Digital circuits within the receiver operate based upon a high frequency clock source. During sleep mode, the circuits are clocked with a low-frequency clock source, which is typically less accurate in frequency. Periodically, the receiver awakens. The hop sequence channel tuned by the receiver is determined by a mapping based upon the channel upon which the receiver expects to receive communications. The mapping can be changed as necessary to improve tolerance to timing error. Furthermore, once communications are received after a sleep period, the frequency error of the low-frequency clock source can be determined, and compensated for after awakening from subsequent sleep periods.

17 Claims, 6 Drawing Sheets

LOW POWER RC CLOCKING SYSTEM FOR WIRELESS COMMUNICATIONS

BACKGROUND OF THE INVENTION

1. Field of the Invention

This invention relates in general to portable wireless communications systems. In particular, the invention relates to a digital circuit clocking system for providing a low power sleep mode in a wireless communications system, such as a cordless telephone.

2. Background Art

Devices incorporating wireless communications techniques are becoming increasingly prevalent in modern society. Moreover, most such devices are now incorporating digital communications techniques to provide greater reliability, enhanced functionality, more efficient bandwidth utilization and improved communications quality. However, system designers are increasingly being asked to meet demands of increased functionality while simultaneously reducing the size and cost of their products.

One communications technique that is commonly used to meet these demands is Frequency Hopping Spread Spectrum ("FHSS") technology. A FHSS transceiver operates by rapidly changing its tuned carrier frequency over time in a known pattern, called the hop sequence or hop pattern. By using different hop sequences, multiple users can communicate simultaneously over differing communications channels all within a common frequency bandwidth. FHSS offers improved communications quality over other solutions in noisy environments because a source of interference at any given frequency affects communications only momentarily. Thus, when the number of noisy channels in the hop sequence is relatively low, the resultant degradation in data throughput, and hence communication quality, is often minimal. Also, many FHSS systems provide for dynamic allocation of frequencies in the hopping sequence, such that static sources of interference can be detected and avoided entirely.

Many FHSS systems which include portable, battery-powered transceivers as communications devices also implement a "sleep mode" feature to reduce power consumption, thereby extending battery life. A sleep mode typically operates by depowering some circuits within the device and reducing the clocking rate of various other digital circuitry during periods of inactivity, thereby reducing electrical power consumption. Such systems then "wake up" periodically to briefly determine whether active communications are required. For example, in a cordless telephone system, the handset may reside in a sleep mode for a majority of the time. The handset wakes up periodically to determine whether a call is being received, or whether the user has indicated a desire to use the system by pressing a button on the handset keypad. If activity is required or requested, the handset enters into and remains in its awake mode, and operates according to its intended functionality. When no activity is required or requested, the handset returns to its sleep mode, thereby resuming its state of reduced power consumption. Battery life can thus be maximized by minimizing the time spent in the awake mode checking for activity.

One aspect of implementing such a sleep mode is providing a clock signal of substantially reduced frequency for clocking of digital circuits. However, conventional FHSS systems face several tradeoffs in implementing a sleep mode with reduced clocking rates. Oscillators are often based upon ceramic or crystal oscillator circuits, which provide a very high degree of accuracy—typically in excess of 0.01%. However, crystal or ceramic oscillators that operate at frequencies sufficiently low to implement a low-power sleep mode are typically large in size and expensive. Thus, low frequency crystals or ceramics are highly disadvantageous for implementing a sleep mode in a compact product for price-sensitive, consumer applications.

Many non-frequency hopping systems utilize a simple and inexpensive RC oscillator (based upon a parallel resistor-capacitor combination) to drive circuits during low-frequency sleep modes. The operating frequencies of such oscillators are typically highly inaccurate, often varying by 10% or more with component tolerances, battery voltages, component temperature, aging, and other factors. This inaccuracy is often inconsequential in systems implementing communications protocols with fixed carrier frequencies, because a constant, fixed frequency broadcast signal can be transmitted with which the portable unit can synchronize upon awaking. However, when a portable unit implementing a frequency hopping system is subjected to timing inaccuracies during its sleep mode, critical timing may drift to the point that the portable unit occupies a different position in the hop sequence than the base unit when the portable unit wakes from the sleep mode. The portable unit may thus proceed to tune its receiver according to the hop sequence, but at a different position in the sequence compared to the base, such that upon returning to the awake mode the portable unit receiver is tuned to a different frequency than the base unit transmitter by virtue of being at different positions in the hop sequence (i.e. the portable unit has lost synchronization). When this occurs, communications typically fail, and system timing must be physically reset before communications can resume.

Several techniques can be implemented to combat such loss of synchronization due to sleep mode induced frequency drift. Since the extent of timing drift is proportional to the duration of sleep time as well as the difference in frequency between the base and handset oscillators, one solution is to reduce the duration of time during which the handset remains in its sleep mode, between periods of waking and reacquiring timing synchronization. However, this increases the ratio of wake time to sleep time, thereby increasing the average power consumption, and reducing battery life.

Other techniques that can be used to combat problems attributable to sleep mode time drift involve altering the hopping pattern of the communications system. For example, in a "marking time" mode the base and portable units hop on a single, pre-arranged frequency so that when the handset awakens, it detects the base unit's query on the pre-arranged frequency and responds thereto. However, if interference is present on the prearranged frequency, subsequent communications can be blocked such that the handset is unable to reacquire synchronization and resume regular communications. Other strategies involve implementing a special slow-hopping pattern whereby the base unit and handset increase the time during which they dwell on each frequency in the hopping pattern, and/or they restrict their hopping to a subset of available working frequencies. These strategies suffer from an increase in the time required to recapture synchronization, thereby degrading system responsiveness. Furthermore, the altered hopping pattern techniques can cause problems in complying with FCC regulations and/or other telecommunications standards, in that such specifications often regulate hop timing, hop sequence size, and/or channel randomization. Finally, systems capable of supporting multiple handsets can be difficult, if not impossible, to implement with such altered standby hopping patterns because some handsets may require that the base implement an altered hopping pattern while other handsets are actively communicating with the base via the regular hopping pattern.

SUMMARY OF THE INVENTION

A frequency-hopping spread spectrum radio receiver capable of operating in an improved low-power sleep mode is presented. The receiver features a flexible technique for re-acquiring synchronization upon awakening, such that the receiver can be rapidly synchronized, and yet it is also capable of compensating for high levels of frequency drift that may occur with inexpensive and easily-implemented sleep mode clocking circuits and prolonged sleep periods. Moreover, the technique does not require any alteration of the hopping pattern of transmitting units in the communications systems from which communications are to be received.

Upon awakening, the receiver determines the frequency channel in the hop sequence upon which communications are expected to be received. However, because the timing of the receiver may have drifted during its sleep period with respect to the timing of transmitting devices in the communications system due to the reduced accuracy of the receiver's low-frequency oscillator, transmitting devices may or may not be tuned to the expected frequency at the same time as the receiver. Thus, the expected frequency is mapped to a target frequency to which the receiver actually tunes. The receiver then tunes to the target frequency and detects whether communications are received.

The mapping step can be accomplished by dividing the hop sequence into a plurality of subsets. Each subset is comprised of a plurality of adjacent hops in the hop sequence. The channels in each subset are mapped to single target frequency channel to which the receiver tunes, such as the centermost frequency in the subset. The mapping can also vary dynamically while the receiver attempts to detect communications. For example, when a communications signal cannot be detected, the size of the subsets can be increased to increase the amount of frequency drift, and therefore timing error, that can be tolerated. Similarly, when a low level of timing error is detected, the size of the subsets can be reduced to improve the responsiveness of the signal detection process during subsequent awakenings.

Once a signal is detected after awakening from a first sleep period, the amount of timing drift that occurred during the sleep period can be determined. After the subsequent sleep period, the anticipated position in the hop sequence can be adjusted by the previously-measured amount of timing drift to compensate for any low-frequency oscillator inaccuracy. This compensation technique can be readily implemented in conjunction with either the fixed mapping technique, or the dynamicallyvarying mapping technique.

DETAILED DESCRIPTION OF THE DRAWINGS

Figure 1:
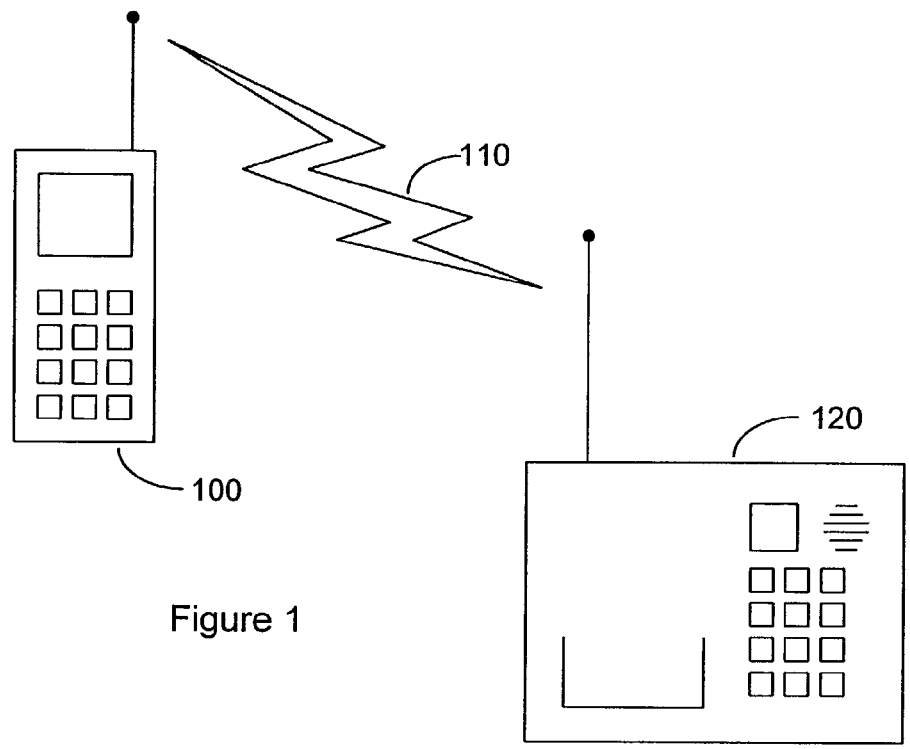
FIG. 1 is a block diagram of a cordless telephone embodiment of the invention.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated.

FIG. 1 illustrates one embodiment of the present invention, comprised of cordless telephone base unit 120 and cordless telephone handset 100. Base unit 120 and handset 100 communicate via FHSS communications link 110. While this illustrated embodiment comprises a cordless telephone system, it is understood that the invention described herein can readily be embodied more broadly in other frequency hopping communications systems that include transceivers capable of implementing a reduced-power "sleep mode".

Figure 2:
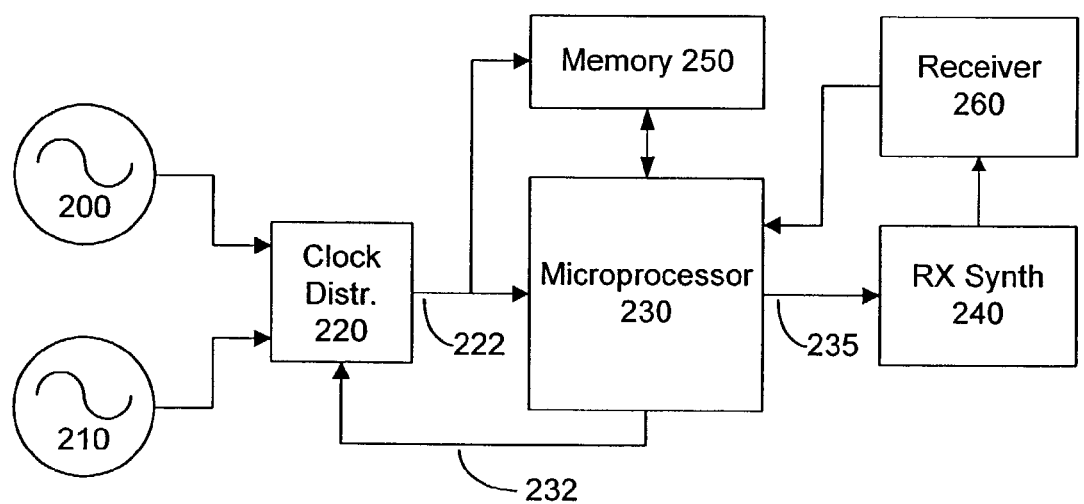
FIG. 2 is a schematic block diagram of a frequency hopping radio receiver capable of operating according to the invention.

Handset 100 includes the circuit elements of FIG. 2 for controlling the clocking of various circuits, as well as the tuning of the handset FHSS receiver. Two clock generation circuits are provided. Crystal oscillator 200 provides a high frequency clock signal, while RC Oscillator 210 generates a low frequency clocking signal. Both clocking signals are fed to clock distribution circuit 220. Clock distribution circuit 220 is controlled by microprocessor 230. The clock distribution circuit selects a clock signal from either crystal oscillator 200 or from RC oscillator 210 for distribution to various digital circuitry within handset 100, including microprocessor 230 and digital memory 250. Microprocessor 230 has a bidirectional communications link to memory 250, which stores information including the hopping pattern used on communications link 110. Microprocessor 230 generates a signal on line 235 that controls the frequency of receive ("RX") synthesizer 240. While handset 100 is engaged in FHSS communications, RX synthesizer 240 generates a radio frequency sine wave with a frequency that varies according to the stored hopping pattern. The output of RX synthesizer 240 is used by receiver circuit 260 to tune incoming signals received via communications link 110.

Because communications link 110 is a frequency hopping link, microprocessor 230 periodically transmits new tuning settings to RX synthesizer 240, such that the receiver is tuned in a pseudo-random pattern, i.e. the hop sequence. In the embodiment illustrated, the series of frequencies to which the handset receiver is tuned is stored in memory 250.

Figure 3:
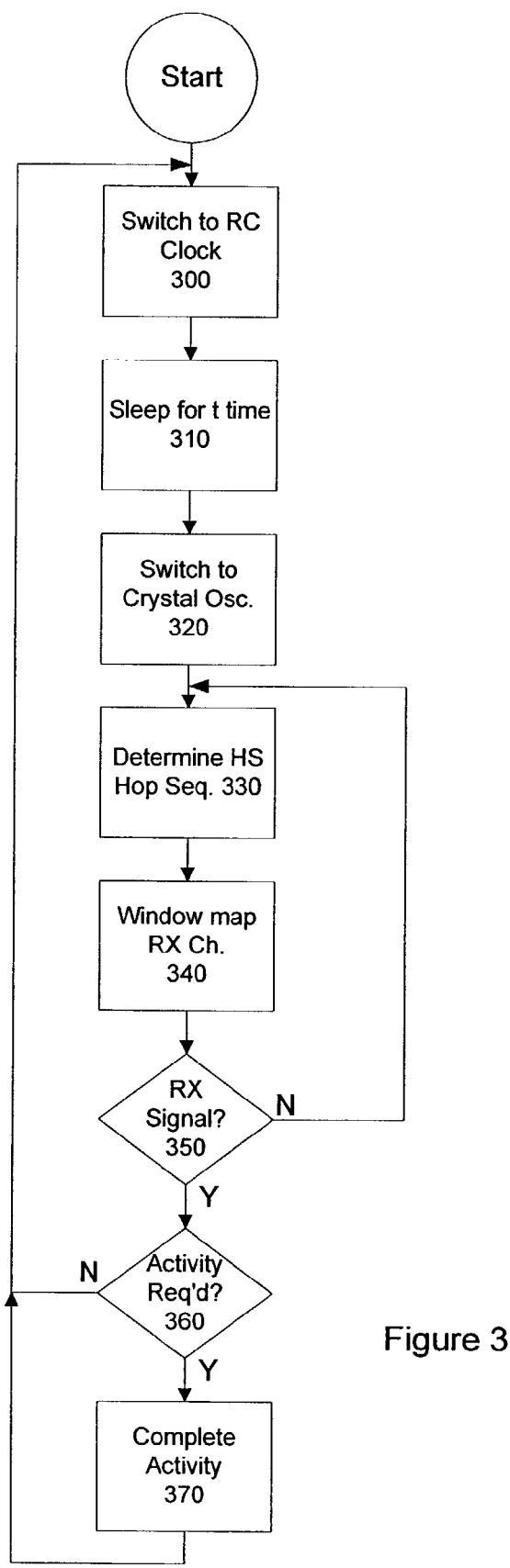
FIG. 3 is a flow chart of receiver operation according to a first embodiment of the invention.

FIG. 3 illustrates the operation of handset 100 during a power conservation "sleep mode" according to one embodiment of the invention. When handset 100 is to be placed into its low power mode, microprocessor 230 signals clock distribution circuit 220 via line 232 to switch its output from a high frequency clock signal derived from crystal oscillator 200, to a low frequency clock signal derived from RC oscillator 210, step 300. Handset 100 then "sleeps" for a period of time in step 310, which period is a multiple of the period of the low frequency clock signal. During step 310, the power consumption of microprocessor 230 and memory 250 is greatly reduced due to the reduced clocking frequencies. Similarly, clock distribution circuit 220 may reduce the frequency of clocks to other digital circuits to further reduce power consumption during step 310. Other circuits may have their clock signals halted entirely, or may be completely de-powered, during this step.

After the sleep period has expired, handset 100 awakens to check for a query signal from base unit 120, and to determine whether activity is required, such as the initiation or receipt of a telephone call. As base unit 120 broadcasts a query signal over the hop sequence, clock distribution circuit 220 switches its output signal 222 back to the high frequency clock signal derived from crystal oscillator 200 in step 320. Based upon the frequency of the low frequency clock signal and the number of clock periods spent "sleeping" in step 310, the handset determines its anticipated position within the hop sequence upon awaking, step 330. For example, if the total sleep period is an integer multiple of the duration of the entire hop sequence, then the handset expects to exit from the sleep mode at the same position in the hop sequence at which it entered. Otherwise, the expected position can be determined via a simple mathematic operation. If the sleep period is fixed, then the relationship between the hop sequence channel at which the sleep mode was entered and the hop sequence channel at which the sleep mode was exited will have a fixed relationship, i.e., the entry and exit hops will be separated by a fixed number of positions in the hop sequence.

While handset 100 can determine the anticipated position within the hop sequence upon awaking, this estimation may be inaccurate because of the inherent inaccuracy and imprecision of the low frequency clock, i.e., the frequency relationship between crystal oscillator 200 and RC oscillator 210 may not be constant, or precisely known. If the hop sequence timing between base 120 and handset 100 drifts while the handset is sleeping, then the receiver in handset 100 may not be listening to a frequency channel at the same time as base unit 120 is broadcasting on that channel.

Figures 4, 6:
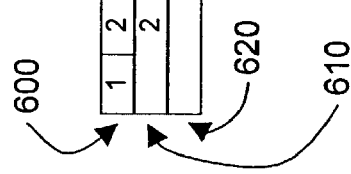
FIG. 4 is a chart illustrating a mapping between the receiver hop sequence position and the tuned channel, according to the first embodiment of the invention.
FIG. 6 is a chart illustrating a variable mapping between the receiver hop sequence position and the tuned channel, according to the second embodiment of the invention.

To combat such frequency drift, microprocessor 230 performs a frequency channel mapping from the channel in the hop sequence at which handset 100 anticipates receiving signals from the base, to a channel to which RX synthesizer 240 will actually be tuned. This mapping operation occurs in step 340. FIG. 4 illustrates an example of a frequency channel mapping of anticipated channels to tuned channels that is utilized in step 340. The hop sequence of FIG. 4 is twenty-seven channels in length. The hop sequence is divided into three windows of nine channels each. The channels in each window are mapped to a tuned channel comprised of the center channel of each window. Thus, the mapping of FIG. 4 allows the handset to find base unit 120 provided that the frequency drift is no greater than plus or minus four hop periods.

In accordance with the mapping of FIG. 4, if handset 100 determines in step 330 that the anticipated hop sequence position is in one of channels one through nine, microprocessor 230 signals RX synthesizer 240 to tune to the frequency corresponding to hop sequence channel 5 in step 340. Similarly, when the hop sequence position is one of channels 10 through 18, RX synthesizer 240 is tuned to channel 14; when the hop sequence position is one of channels 19–27, RX synthesizer 240 is tuned to channel 23.

While the illustrated embodiment utilizes twenty-seven frequency channels in its hop sequence, divided up into three equal-sized groups with centered tuned channels, it is understood that numerous other such mappings can be implemented, as is appropriate for the design objectives of a particular communications system.

Once the receiver is tuned to the mapped frequency channel, receiver 260 determines whether a query signal from base unit 120 is successfully detected during the current hop, step 350. If not, then handset 100 repeats steps 330 and 340 for the subsequent hop, continuing to attempt detection of the base unit query. Once communications with the base unit are established in step 350, handset 100 can synchronize its position in the hop sequence with the base by proceeding to step through the hop sequence at full rate, in accordance with the accurate and stable "full power" timing provided by crystal oscillator 200, which should be consistent with that of base unit 120. Handset 100 then determines whether any activity is required such as the conduction of a telephone call, step 360. Any required activity is completed, step 370. Afterwards, handset 100 can return to step 300 and re-enter its low-power sleep mode.

While the amount of frequency drift that can be tolerated by the system increases in proportion to the size of the mapping windows of step 340, the responsiveness and power efficiency of the handset deteriorate with increased window size. For example, consider the mapping of FIG. 4 implemented in a system in which no actual frequency drift has occurred. If the handset awakens on channel 6 of the hop sequence, it will proceed to waste eight frequency hops before resolving communications with the base unit on channel 14. This creates a delay during which the handset remains inactive, thereby reducing the responsiveness of the system. Additionally, the handset is placed into its awakened state of increased power consumption during the eight "wasted" hops, thereby squandering precious battery power.

Figure 5:
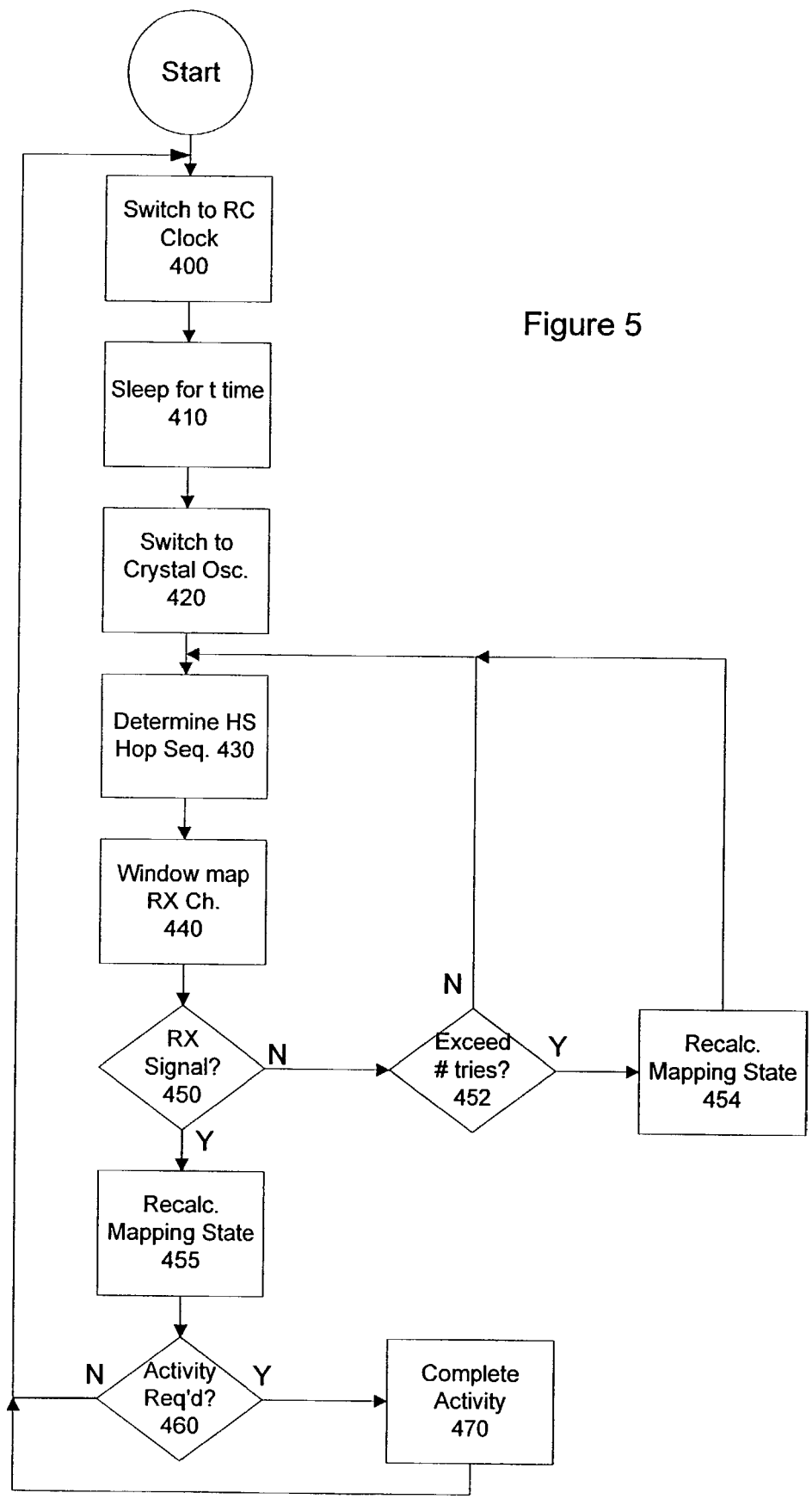
FIG. 5 is a flow chart of receiver operation according to a second embodiment of the invention that provides for a variable channel mapping.

Therefore, a "sliding search window" technique is also provided to maximize handset responsiveness and power efficiency when frequency drift is low, yet allow for reliable synchronization of the handset with the base unit even in the presence of severe frequency drift. FIG. 5 illustrates an embodiment of the sliding search window technique. Steps 400 through 430 operate analogously to steps 300 through 330 described above. However, step 440 utilizes a variable window mapping, such as that depicted in FIG. 6.

Figure 7:
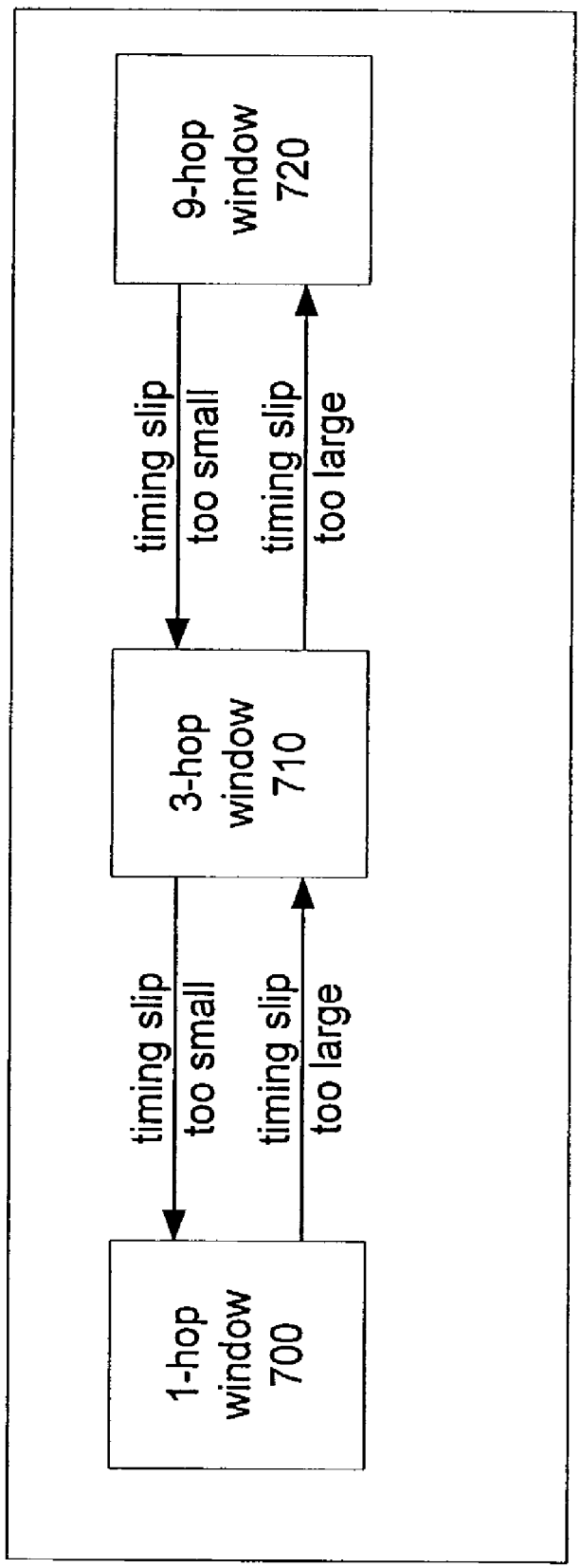
FIG. 7 is a state diagram illustrating mapping state determination according to the second embodiment of the invention.

Mapping step 440 can initially be performed using first mapping level 600, which is a one-to-one correspondence between the anticipated hop sequence channel and the channel actually tuned by RX synthesizer 240. In subsequent iterations, it may be desirable to maintain a window mapping state during sleep periods, such that a mapping which was previously determined to be appropriate for the level of frequency error of oscillator 210 can be immediately utilized on subsequent awakenings, rather than requiring the repeated determination of an optimal window mapping. Thus, FIG. 7 illustrates a state diagram, whereby the active window mapping is maintained between wake periods. The mapping used in step 440 is therefore determined by the state diagram of FIG. 7.

In step 450, receiver 260 determines whether a base query signal is successfully received on the tuned channel. If so, then the handset has been synchronized. In step 455 the mapping state of FIG. 7 is then adjusted, if appropriate, to optimize the mapping window for the timing error measured. This is done by reducing the mapping window size if a smaller window covers the observed channel offset. The channel offset is the difference between the anticipated hop sequence hop on which synchronization was expected (as determined in the most recent iteration of step 530) and the tuned channel on which the base query signal is ultimately detected (which was determined in step 540). For example, if the receiver synchronizes with zero channel offset while occupying state 710 of FIG. 7, then the mapping state is adjusted downwards from state 710 to state 700, such that synchronization is likely to occur immediately upon subsequent awakenings. Likewise, if the receiver synchronizes with a channel offset of one or fewer hops while occupying state 720 of FIG. 7, then the mapping state is adjusted downwards from state 720 to state 710 for subsequent awakenings. Finally, any full-power handset activity that may be required is performed in steps 460 and 470, analogously to steps 360 and 370.

However, if the base query signal is not successfully detected during the current frequency hop in step 450, then in step 452 microprocessor 230 determines whether the window mapping should be adjusted upwards. In the embodiment of FIG. 5, this is determined when the number of attempts to receive the query signal using the current frequency mapping exceeds a predetermined threshold number. For example, it may be desirable to attempt synchronization using mapping level 600 three times, incase the initial attempts to receive the base query are thwarted by effects such as interference on the frequency channels, rather than any frequency drift that may have occurred during sleep mode. However, if it is determined in step 452 that the base query cannot be detected using the current window mapping, the window mapping is recalculated in step 454 to move to a higher state in the state diagram of FIG. 7. Steps 430 et seq. are then repeated using a different window mapping. For example, if mapping level 600 is unsuccessful, the receiver state is moved from state 700 to state 710 such that synchronization is attempted using mapping level 610, in which each window is three frequency hops in length. Thus, in state 710, synchronization can be achieved in the presence of frequency drift of plus or minus one hop period. If synchronization cannot be achieved in state 710, then the windowing state is advanced to state 720, corresponding to mapping level 620, thus providing for windows of nine hop periods in length, and a frequency drift tolerance of plus or minus four hop periods. By implementing the operation of FIG. 5 in conjunction with a layered hop sequence mapping such as that of FIG. 6, a flexible sleep mode is provided which allows for quick and efficient synchronization after awakening from a sleep mode, yet is also highly resilient in the face of timing inaccuracies caused extended sleep periods and simple, inexpensive low-frequency clocking circuits.

Figure 8:
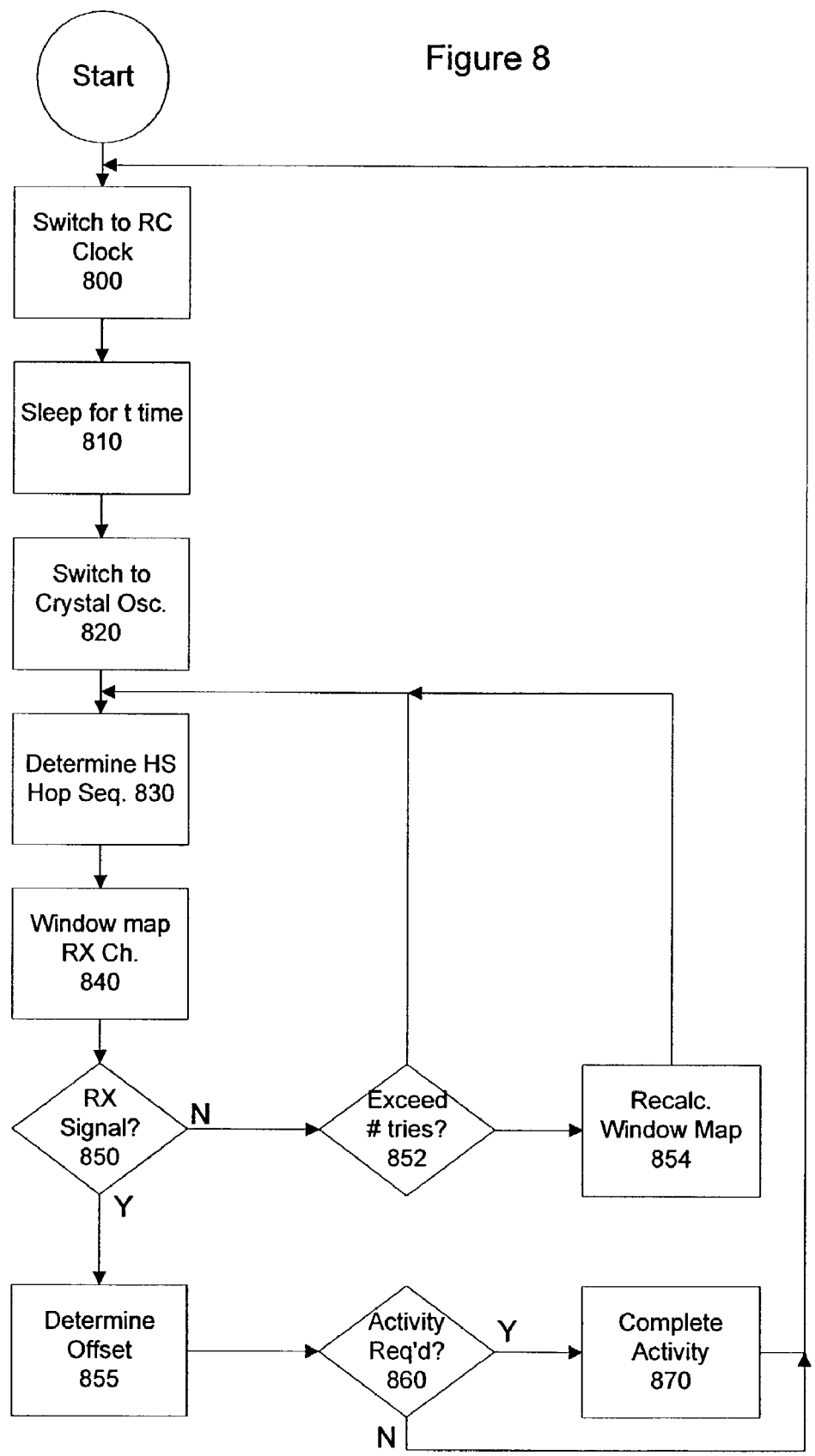
FIG. 8 is a flow chart of receiver operation according to a third embodiment of the invention that compensates for the frequency inaccuracy of the low-frequency clock source.

In accordance with yet another aspect of the invention, an automatic calibration technique is provided whereby the frequency error of the low frequency oscillator can be compensated for to further improve the responsiveness and power efficiency of the system, without sacrificing its tolerance of high levels of timing error. FIG. 8 illustrates the operation of an embodiment of the invention incorporating both the sliding search window feature described above, as well as a low frequency oscillator calibration feature. Steps 800 through 854 operate analogously to steps 400 through 454, respectively, in invoking a temporary sleep mode and subsequently attempting to reinitiate communications with base unit 120.

However, once the base query signal is detected in step 850, the handset determines the channel offset in step 855, which is the difference between the positions in the hop sequence of the channel on which the base query signal was expected (determined in step 830) and the tuned channel on which the base query signal is ultimately detected (determined in step 840). The offset is stored in memory 250 for later use upon awakening from sleep periods. During subsequent iterations, the channel offset is used to determine the handset position in the hop sequence mapped during step 840 by simply subtracting the offset from the position otherwise anticipated in step 830, thereby compensating the current handset timing for the level of timing error that had occurred during the previous sleep period. In most circumstances, the timing drift of low frequency oscillator 210 between any two consecutive sleep periods should be small, such that the handset and base unit remain synchronized. However, when frequency drift does occur, the above-described windowing mechanism ensures that synchronization can be recovered.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method for reducing power consumption of a radio receiver in a frequency hopping communications system that operates according to a hop sequence comprised of a set of channels corresponding to discrete radio frequencies to which the radio receiver is sequentially tuned, the method comprising the steps of:
    (a) entering a sleep mode, during which at least some receiver digital circuits are clocked with a low-frequency clock source;
    (b) awakening from the sleep mode, such that said at least some receiver digital circuits are clocked with a high-frequency clock source;
    (c) determining an expected channel in the hop sequence upon which communications are expected to be received;
    (d) deriving a target channel in the hop sequence based upon the expected channel according to a channel mapping, wherein the channel mapping defines a correspondence between the expected channel and the target channel;
    (e) tuning the radio receiver to the target channel;
    (f) determining whether a communications signal is detected on the target channel;
    (g) repeating steps (c), (d), (e) and (f) for another expected channel in the hop sequence if the communications signal is not detected.

2. The method of claim 1, in which the channel mapping divides the hop sequence into a plurality of subsets of consecutive channels wherein each channel within each of said plurality of subsets of consecutive channels corresponds to the target channel within the same subset.

3. The method of claim 1, in which the channel mapping divides the hop sequence into a plurality of subsets of consecutive channels, and wherein each channel within each of said plurality of subsets of consecutive channels corresponds to target channel that is the target channel that is a centermost channel within the same subset.

4. A method for reducing power consumption of a radio receiver in a frequency-hopping communications system that operates according to a hop sequence comprised of a set of channels corresponding to discrete radio frequencies to which the radio receiver is sequentially tuned, the method comprising the steps of:

(a) entering a sleep mode, during which at least some receiver digital circuits are clocked with a low-frequency clock source;
(b) awakening from the sleep mode, such that said at lease some receiver digital circuits are clocked with a high-frequency clock source;
(c) determining an expected channel in the hop sequence upon which communications are expected to be received;
(d) determining a compensated expected channel by adjusting the expected channel by a calibration offset;
(e) deriving a target channel in the hop sequence based upon the compensated expected channel according to a channel mapping, where the channel mapping defines a correspondence between the compensated expected channel and the target channel;
(f) tuning the radio receiver to the target channel;
(g) determining whether a communications signal is detected on the target channel;
(h) repeating steps (c), (d), (e) and (f) for another expected channel in the hop sequence if the communications signal is not detected;
(i) calculating the calibration offset to be a number of frequency hop periods by which the expected channel differs from the target channel when the communications signal is detected.

5. The method of claim 4, in which the channel mapping divides the hop sequence into a plurality of subsets of consecutive channels and wherein each channel within each of said plurality of subsets of consecutive channels corresponds to the target channel that is within the same subset.

6. The method of claim 4, in which the channel mapping divides the hop sequence into a plurality of subsets of consecutive channels, and wherein each channel within each of said plurality of subsets of consecutive channels corresponds to the target channel that is a centermost channel within the same subset.

7. A method for reducing power consumption of a radio receiver in a frequency-hopping communications system that operates according to a hop sequence comprised of a set of channels corresponding to discrete radio frequencies to which the radio receiver is sequentially tuned, the method comprising the steps of:
(a) entering a sleep mode, during which at least some receiver digital circuits are clocked with a low-frequency clock source;
(b) awakening from the sleep mode, such that said at least some receiver digital circuits are clocked with a high-frequency clock source;
(c) determining an expected channel in the hop sequence upon which communications are expected to be received;
(d) deriving a target channel in the hop sequence based upon the expected channel according to one of a plurality of channel mappings, where each channel mapping defines a different correspondence between the expected channel and the target channel;
(e) tuning the radio receiver to the target channel;
(f) determining whether a communications signal is detected on the target channel;
(g) repeating steps (c), (d), (e) and (f) for the another expected channel in the hop sequence if the communications signal is not detected.

8. The method of claim 7, in which each channel mapping divides the hop sequence into a plurality of subsets of consecutive channels, and wherein each channel within each of said plurality of subsets of consecutive channels corresponds to the target channel that is within the same subset.

9. The method of claim 7, in which each channel mapping divides the hop sequence into a plurality of subsets of consecutive channels, and wherein each channel within each of said plurality of subsets of consecutive channels corresponds to the target channel that is a centermost channel within the same subset.

10. The method of claim 8, in which each channel mapping is chosen based upon whether the communications signal was detected during prior repetition of step (f).

11. The method of claim 9, in which each channel mapping is chosen based upon whether the communications signal was detected during prior repetition of step (f).

12. The method of claim 8, in which each channel mapping with an increased number of channels within each subset is used during step (d) when the communications signal is not detected during a predetermined number of consecutive repetitions of step (f).

13. The method of claim 9, in which each channel mapping with an increased number of channels within each subset is used during step (d) when the communications signal is not detected during a predetermined number of consecutive repetitions of step (f).

14. A method for reducing power consumption of a radio receiver in a frequency-hopping communications system that operates according to a hop sequence comprised of a set of channels corresponding to discrete radio frequencies to which the radio receiver is sequentially tuned, the method comprising the steps of:
(a) entering a sleep mode, during which at least some receiver digital circuits are clocked with a low-frequency clock source;
(b) awakening from the sleep mode, such that said at least some receiver digital circuits are clocked with a high-frequency clock source;
(c) determining an expected channel in the hop sequence upon which communications are expected to be received;
(d) determining a compensated expected channel by adjusting the expected channel by a calibration offset;
(e) deriving a target channel in the hop sequence based upon the compensated expected channel according to one of a plurality of channel mappings, where each channel mapping defines a different correspondence between the compensated expected channel and the target channel;
(f) tuning the radio receiver to the target channel;
(g) determining whether a communications signal is detected on the target channel;
(h) repeating steps (c), (d), (e) and (f) for another expected channel in the hop sequence if the communications signal is not detected;
(i) calculating the calibration offset to be a number of frequency hop periods by which the expected channel differs from the target channel when the communications signal is detected.

15. The method of claim 14, in which each channel mapping divides the hop sequence into a plurality of subsets of consecutive channels, and wherein each channel within each of said plurality of subsets of consecutive channels corresponds to the target channel that is within the same subset.

16. The method of claim 15, in which each channel mapping is selected based upon a difference in a number of channels between the compensated expected channel and the target channel at the time of the last detection of the communications signal.

17. The method of claim 16, in which each subset of the selected channel mapping contains at least one more than twice the difference in the number of channels between the compensated expected channel and the target channel at the time of the last detection of the communications signal.

* * * * *